(12) United States Patent
Janson

(10) Patent No.: US 8,998,766 B1
(45) Date of Patent: Apr. 7, 2015

(54) LOW PROFILE VEHICLE AXLE

(71) Applicant: Ford Global Technologies, LLC, Dearborn, MI (US)

(72) Inventor: David A. Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 14/041,478

(22) Filed: Sep. 30, 2013

(51) Int. Cl.
*F16H 48/10* (2012.01)
*F16H 48/42* (2012.01)

(52) U.S. Cl.
CPC ............... *F16H 48/10* (2013.01); *F16H 48/42* (2013.01)

(58) Field of Classification Search
USPC ........................................................ 475/221
See application file for complete search history.

(56) References Cited

U.S. PATENT DOCUMENTS

| 7,044,880 | B2 | 5/2006 | Bowen |
| 7,479,085 | B2 | 1/2009 | Finn |
| 2005/0266952 | A1* | 12/2005 | Puiu ............................ 475/205 |
| 2012/0021863 | A1 | 1/2012 | Hirao et al. |

* cited by examiner

*Primary Examiner* — Erin D Bishop
(74) *Attorney, Agent, or Firm* — James Dottavio; MacMillan, Sobanski & Todd, LLC

(57) ABSTRACT

An axle assembly includes first and second spiral bevel gears meshing with a pinion, a gearset including a sun gear secured to the first bevel gear, a ring gear secured to the second bevel gear, and planet pinions supported on a carrier and meshing with the sun gear and ring gear, and a differential including an input secured to the carrier, and first and second outputs secured, respectively to first and second output shafts.

13 Claims, 1 Drawing Sheet

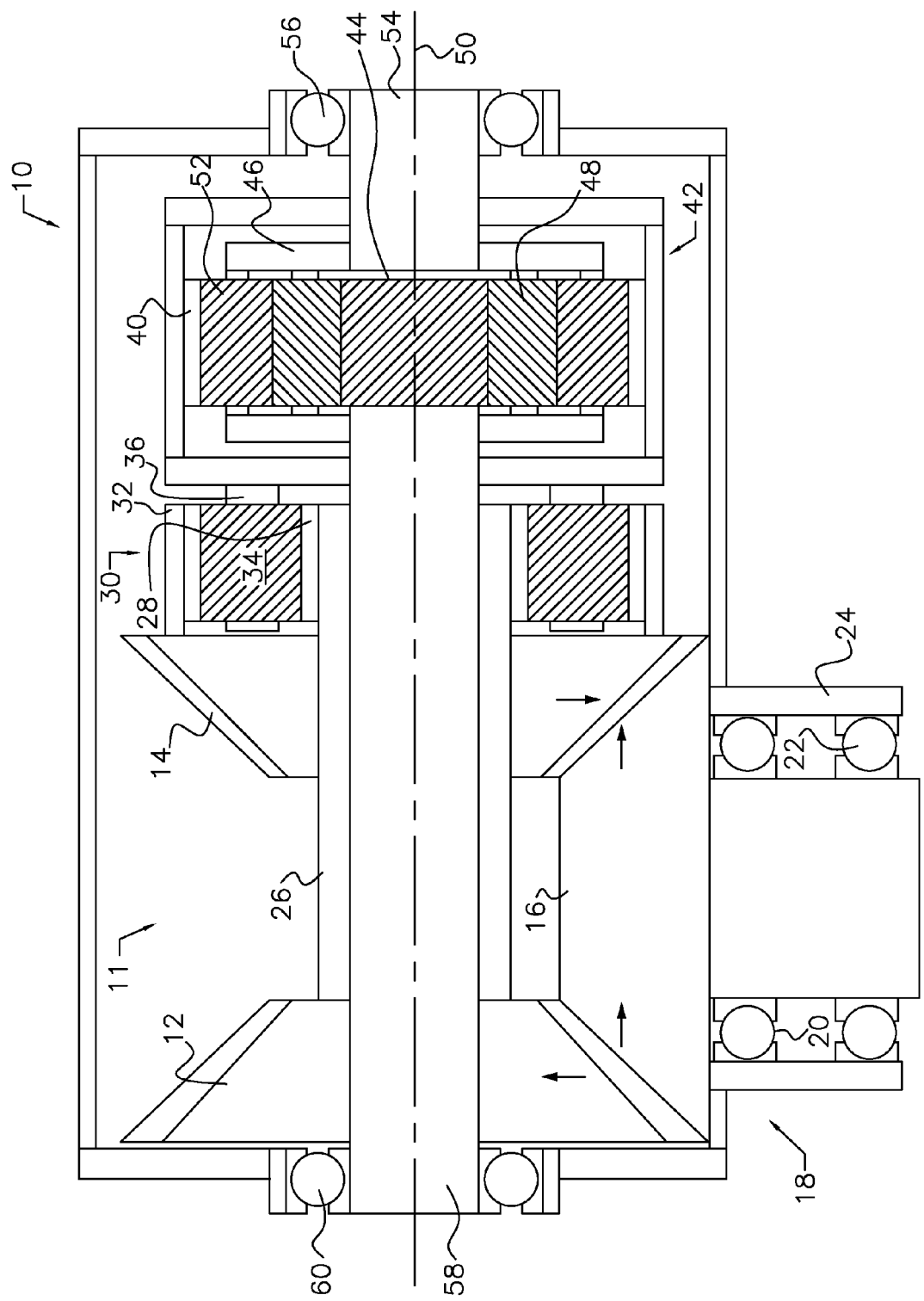

LOW PROFILE VEHICLE AXLE

BACKGROUND OF THE INVENTION

1. Field of the Invention

This invention relates generally to an axle for transmitting torque between a transmission output and the driven wheels of a motor vehicle.

2. Description of the Prior Art

The driven axle of a motor vehicle usually includes a differential mechanism through which torque is transmitted differentially to the driven wheels located on the axis of the axle. Generally the vehicle's powertrain includes a final drive mechanism, whose output is underdriven with respect to its input, which is driveably connected to the output of a transmission.

A need exists in the industry for an axle assembly that is compact and efficient.

SUMMARY OF THE INVENTION

An axle assembly includes first and second spiral bevel gears meshing with a pinion, a gearset including a sun gear secured to the first bevel gear, a ring gear secured to the second bevel gear, and planet pinions supported on a carrier and meshing with the sun gear and ring gear, and a differential including an input secured to the carrier, and first and second outputs secured, respectively, to first and second output shafts.

The axle assembly can use ATF fluid, has lower bearing loads due to the potential to balance gear forces internally to reduce support bearing size and loss, has compact size to improve packaging, reduces gear sliding and provides better mesh control for modulating noise, vibration and harshness (NVH).

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a schematic cross section showing the axle assembly of a motor vehicle.

DESCRIPTION OF THE PREFERRED EMBODIMENT

The axle assembly 10 of FIG. 1 includes a spiral bevel gear set 11, which includes first and second spiral bevel gears 12, 14 meshing with a single input pinion 16 of a bevel gear differential 18. Bearing 20, 22 support input pinion 16 on a casing 24.

Spiral bevel gear 12 is driveably connected by a sleeve shaft 26 to the sun gear 28 of a planetary gear set 30. Spiral bevel gear 14 is driveably connected to the ring gear 32 of gear set 30. Planet pinions 34 of gear set 30, supported for rotation on carrier 36, are in continuous meshing engagement with sun gear 28 and ring gear 32.

Carrier 36 is driveably connected to the ring gear 40 of a planetary differential 42. The planetary differential 42 further includes a sun gear 44; a planet pinion carrier 46; first planet pinions 48, spaced angularly about axis 50, supported for rotation of carrier 46 and meshing with sun gear 44; and second planet pinions 52, spaced angularly about axis 50, supported for rotation of carrier 46 and meshing with ring gear 40.

A first axle shaft 54, supported by bearing 56 on casing 24, is driveably connected to carrier 46 and to a first driven wheel of a motor vehicle.

A second axle shaft 58, supported by bearing 60 on casing 24, is driveably connected to sun gear 44 and to a second driven wheel of the motor vehicle.

Preferably the speed ratio of bevel gear differential 18 is about 1:1. Preferably the beta ratio, i.e., the ratio of the pitch diameter of ring gear 32 and the pitch diameter of sun gear 28, of planetary gear set 30 is about 1.5. Preferably the speed ratio of the axle assembly 10 is about 3.5:1.

Planetary gear set 30 mixes the oppositely rotating torsional outputs 12, 14 of the bevel gear set 11 and underdrives carrier 36 at about 20 percent of the speed of input pinion 16, thereby producing a speed reduction comparable to that of a final drive.

Alternately, planetary differential 42 may be replaced a bevel gear differential (not shown), whose arrangement of bevel pinions in the bevel gear differential is similarly to that of bevel pinion 16, a first side bevel gear engaged with the bevel pinions and driveably connected to output shaft 54, and a second side bevel gear engaged with the bevel pinions and driveably connected to output shaft 58.

In accordance with the provisions of the patent statutes, the preferred embodiment has been described. However, it should be noted that the alternate embodiments can be practiced otherwise than as specifically illustrated and described.

The invention claimed is:

1. An axle assembly, comprising:
    first and second spiral bevel gears meshing with a pinion;
    a gearset including a sun gear secured to the first bevel gear,
        a ring gear secured to the second bevel gear, and planet pinions supported on a carrier and meshing with the sun gear and ring gear;
    a differential including an input secured to the carrier, and first and second outputs secured, respectively, to first and second output shafts.

2. The axle assembly of claim 1, wherein the differential is a planetary differential, further comprising:
    a second ring gear operating as the input and secured to the carrier;
    a second carrier secured to the first output shaft;
    a second sun gear secured the second output shaft;
    second planet pinions supported on the second carrier and meshing with the second sun gear;
    third planet pinions supported on the second carrier and meshing with the second ring gear and the second planet pinions.

3. The axle assembly of claim 1, further comprising:
    a casing;
    a bearing supporting the pinion for rotation on the casing;
    a second bearing supporting the first output shaft for rotation on the casing;
    a third bearing supporting the second output shaft for rotation on the casing.

4. The axle assembly of claim 1, wherein a beta ratio of the planetary gearset is about 1.5.

5. The axle assembly of claim 1, wherein a rotational speed of the first and second spiral bevel gears is substantially equal to a speed of the pinion.

6. The axle assembly of claim 1 having a speed ratio substantially equal to 3.5:1.

7. An axle assembly, comprising:
first and second bevel gears meshing with a pinion;
a planetary gearset including first and second members connected, respectively, to the first and second bevel gears, and an output underdriven relative to the first and second bevel gears;
a differential including an input connected to the output, and first and second outputs connected, respectively, to first and second output shafts.

8. The axle assembly of claim 7, wherein the planetary gearset includes:
a sun gear as the first member, and the sun gear is secured to the first bevel gear;
a ring gear as the second member, and the ring gear is secured to the second bevel gear; and
a carrier as the output;
planet pinions supported on the carrier and meshing with the sun gear and the ring gear.

9. The axle assembly of claim 8, wherein the differential is a planetary differential, further comprising:
a second ring gear operating as the input and secured to the carrier;
a second carrier secured to the first output shaft;
a second sun gear secured the second output shaft;
second planet pinions supported on the second carrier and meshing with the second sun gear;
third planet pinions supported on the second carrier and meshing with the second ring gear and the first planet pinions.

10. The axle assembly of claim 7, further comprising:
a casing;
a bearing supporting the pinion for rotation on the casing;
a second bearing supporting the first output shaft for rotation on the casing;
a third bearing supporting the second output shaft for rotation on the casing.

11. The axle assembly of claim 7, wherein a beta ratio of the planetary gearset is about 1.5.

12. The axle assembly of claim 7, wherein a rotational speed of the first and second bevel gears is substantially equal to a speed of the pinion.

13. The axle assembly of claim 7 having a speed ratio substantially equal to 3.5:1.

* * * * *